Dec. 15, 1931.   G. BRANDT   1,836,953
REDUCING FURNACE
Filed March 11, 1929
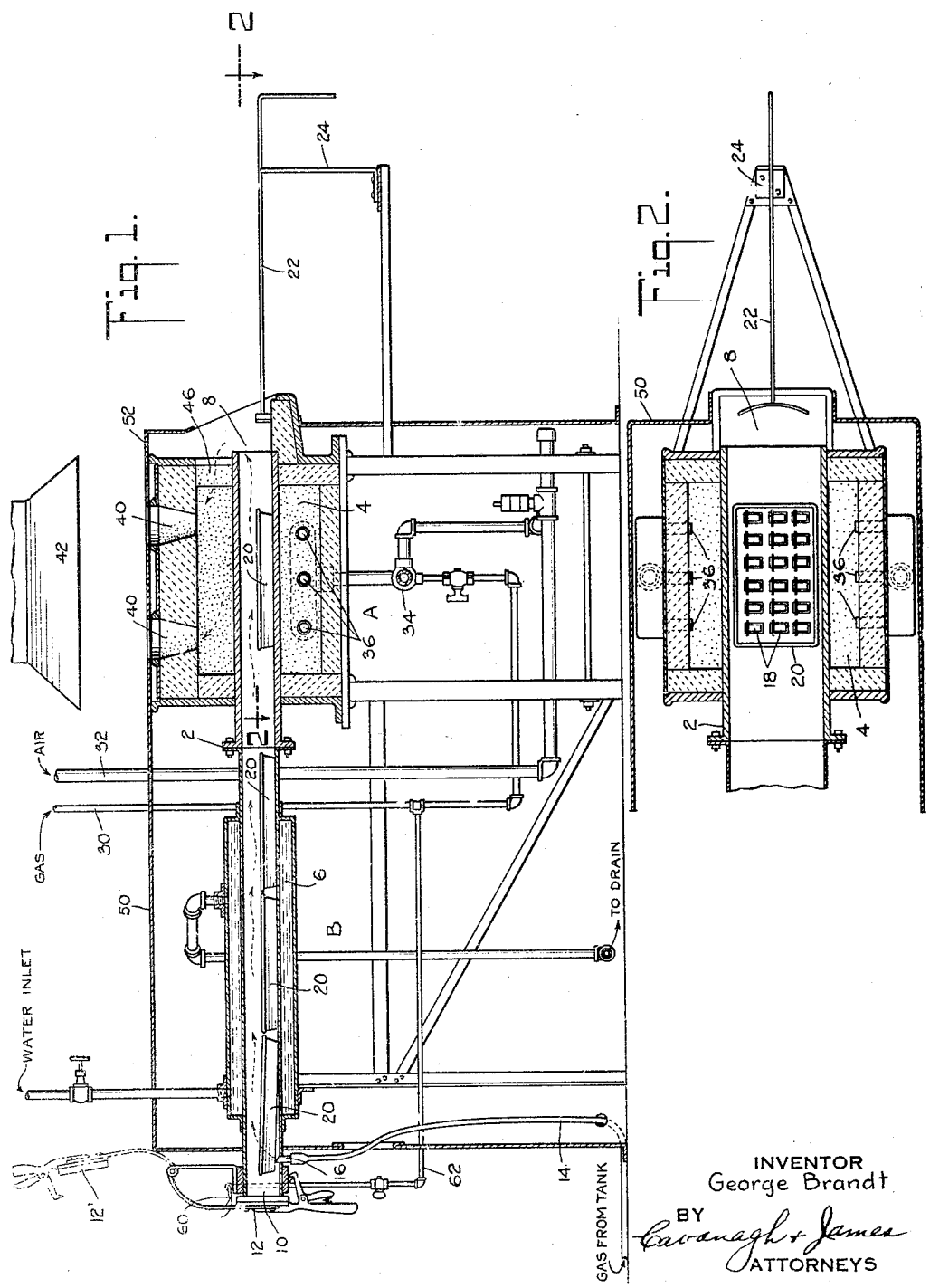
INVENTOR
George Brandt
BY
Cavanagh + James
ATTORNEYS Patented Dec. 15, 1931

1,836,953

UNITED STATES PATENT OFFICE

GEORGE BRANDT, OF NEW YORK, N. Y., ASSIGNOR TO BRANDT ENGINEERING CORPORATION, OF NEW YORK, N. Y., A CORPORATION OF NEW YORK

REDUCING FURNACE

Application filed March 11, 1929. Serial No. 345,946.

This invention relates to reducing furnaces in general, and more particularly to a method and furnace for brazing and/or annealing parts of jewelry in a reducing atmosphere.

In brazing in general, and more especially in brazing parts of jewelry such as the elements of watch cases and the like, it has heretofore been the custom to use a torch. This method suffers from a number of disadvantages, most pronounced of which are the slowness of production, and the oxidation of the material being brazed. To remove the oxidized surface necessitates an additional pickling and cleaning operation which often proves to be a rather troublesome one, and requires subsequent drying before further operations can be performed. Some manufacturers prefer to dip the parts in a borax or other suitable solution before brazing, in order to prevent oxidation during the brazing operation, but this method, aside from the dipping step, necessitates subsequent soaking of the parts in order to remove the preliminarily applied coating.

In the manufacture of non-ferrous metallic articles it is often important to anneal the articles in order to facilitate subsequent manufacturing steps, such as machine work in general, and more particularly, pressing the articles to shape, or striking a design thereon. Non-ferrous metals of the general class here involved, such as gold, silver, brass, copper, German silver, nickel, and the like, are annealed by heating followed by rather sudden chilling, a process which is just the reverse of that which would apply to steel and similar ferrous metals. This annealing has heretofore been accomplished by heating the parts to be annealed either with a torch, or in an ordinary heating furnace, and thereafter plunging the heated parts into a liquid quenching medium such as water. The heating operation is accompanied by the disadvantages of oxidation which have already been mentioned in connection with the brazing process, and the quenching operation serves to leave the parts in a wet condition, again necessitating drying before other subsequent operations may be proceeded with.

The primary objects of my invention are to increase the rate of production of the brazed and/or annealed articles and at the same time to eliminate the undesirable oxide film, and to leave the work in a dry state ready for subsequent manufacturing and operations. To the accomplishment of the foregoing objects, my invention comprehends a method which includes passing the parts to be brazed through a heated region and thereafter through a dry cooled region all in the presence of a reducing atmosphere, which obviates the production of an oxide film. To put the process on a production scale a large number of the parts to be brazed are arranged on trays and a train of these trays are passed in sequence through the heated and cooled regions, the cooled trays being finally removed from the reducing atmosphere while still in a dry state, no oil or other liquid seal being needed to confine the reducing gas, and no quenching, pickling or soaking operations being needed to prepare the parts for further manufacturing operations.

The brazing method is applicable to almost any type of metal, while the annealing method is more especially applicable to non-ferrous metals such as are generally used in the manufacturing jewellers art, for the cooled region has a chilling effect which is rather sudden and more apt to harden than to anneal ferrous metals, but which does anneal the non-ferrous metals. With the latter type of work if brazing is to be done the operations of brazing and of annealing may both be advantageously combined into a single operation, for the brazing temperature is ordinarily higher or at least as high as the annealing temperature.

The heated and cooled regions are most simply formed by arranging the reducing furnace in the form of a relatively long tube having a heating furnace surrounding one portion thereof, and a water jacket surrounding another portion thereof. In order to make the process continuous a work entrant opening is provided at one end and a work discharge opening at the other end of the tube. In preferred form, the latter end is equipped with a door which may be opened for the removal of the endmost cooled tray of work, and the reducing gas is fed to the tube near that end, and flows toward and out of the work entrant end thereof.

Two difficulties result, to overcome which is another object of my invention. In the first place, the reducing gas leaving the entrant end of the tube is only partially, if even noticeably, spent, and it therefore is not safe to let it discharge freely into the room, both because of the resulting contamination of the atmosphere therein, and because of the possibility of an explosion taking place. To obviate this difficulty I provide means at the entrant end of the tube for guiding the used reducing gas into a flue which is anyway provided for the heating furnace. Still better, the reducing gas is first fed into the heating furnace, and thence into the flue, for while in the furnace it is consumed and so aids in heating the tube to the desired brazing temperature.

The second difficulty arises at the work discharge end of the tube, for when the door is opened for the removal of the finished work the reducing gas escapes directly into the room, with consequent danger, and to avoid this I provide a pilot light adjacent but outside of the door, so that the reducing gas is ignited the moment the door is opened. This prevents explosion outside the furnace, and also inside the furnace after the door is closed, because the ignited gas rapidly consumes whatever air has meanwhile been admitted to the furnace tube.

To the accomplishment of the foregoing and such other objects as will hereinafter appear, my invention consists in the brazing and/or annealing method and the furnace elements and their relation one to the other, as hereinafter are more particularly described and sought to be defined in the claims; reference being had to the accompanying drawings which show a preferred embodiment of my invention, and in which:

Fig. 1 is an elevational section taken longitudinally through the reducing furnace; and Fig. 2 is a horizontal section taken in the plane of the line 2—2 in Fig. 1.

Referring to the drawings, the furnace comprises a reducing furnace chamber in the form of a relatively long furnace tube 2 consisting of a heating section A, and a cooling section B. The section A is heated by a surrounding heating furnace chamber 4, while the section B is cooled by a surrounding water jacket 6. The tube 2 is provided with a work entrant opening 8 and a work discharge opening 10, the latter being closed by a door 12. Reducing gas, preferably hydrogen, is fed from a tank through a pipe 14 to the tube 2, the inlet 16 thereof being located near the closed end of the tube.

As is best shown in Fig. 2, a large number of parts to be brazed and/or annealed, 18, are laid out in trays, 20, and these trays are of proper dimension so that they may be slid along the bottom of the tube 2. The tube 2 is therefore preferably, but not necessarily, made rectangular in cross section. A pusher rod 22, guided by a pedestal 24, is provided for moving up the entire train of trays each time that a finished and cooled tray is removed from the discharge end of the furnace. It is obvious that oxidation is prevented owing to the presence of the reducing atmosphere, and that production is rapid because of the large number of articles being heat treated at one time and because of the continuity of the process. It is also obvious that the use of the door 12 is far simpler than the use of a liquid seal, and permits removal of the finished work in a dry state.

Considered more in detail, it will be observed that the heating furnace 4 preferably burns fuel or illuminating gas, supplied through a pipe 30, while air may be supplied under pressure through a pipe 32, the two being mixed at a junction 34. The piping thereafter is divided, and leads the mixture to the sides of the furnace, where it is burned at the multiple burners 36. The furnace chamber surrounds the tube 2, and the products of combustion therefrom are led through one or more flues 40 to a hood 42 and then to a chimney or induced draft fan.

The reducing gas ordinarily is not consumed by the time it reaches the end 8 of the furnace tube, and it is desirable, therefore, to insure against the possibility of accumulation and explosion of this gas. In accordance with my invention, the forward wall of the furnace chamber is left open, as at 46, and the discharged or used reducing gas is drawn by the chimney action, as shown by the dotted arrows, from the end 8 of the tube into the furnace chamber and thence up the flues 40. The main outside cover 50 of the furnace may form a sort of hood 52 at this end in order to help guide the reducing gas into the furnace chamber. One important advantage of this arrangement, aside from obviating the necessity of providing an additional flue for the reducing gas, is that the combustion of the reducing gas within the furnace chamber helps heat the tube up to the desired temperature, either for annealing, or for brazing, as the case may be.

When the door 12 is opened to remove a cooled tray 20 from the furnace, reducing gas from the inlet 16 tends to flow directly out of the end 10, and causes the dangers of contamination by, and possible explosion of, the escaping gas. To obviate this danger I place a pilot light 60, fed with gas from the pipe 30 through a branch 62, so that it is adjacent but outside of the door, and normally is of no effect. However, when the door 12 is opened, as shown in dashed lines at 12', the pilot light serves to instantly ignite the escaping gas, resulting in a flame which hovers at the upper side of the tube and does not interfere with the manual removal of the endmost tray. The pilot light performs an additional function in preventing the possibility of an explosion within the furnace after the door 12 is closed, for instead of having a mixture of air and gas which may remain in the tube until it reaches the heating section A thereof at which time an explosion or flare-out injurious to the workman may occur, the reducing gas is pre-ignited when the door 12 is closed and the relatively cool flame, which moves toward the entrant end of the tube because the incoming reducing gas is not accompanied by air and therefore is not combustible, consumes the available air, admitted when the door was opened, gradually, and ordinarily long before the ignited gas reaches the entrant end of the furnace tube.

My method and furnace adds to the speed of production of brazed and/or annealed parts, increases their uniformity, avoids oxidation, and at the same time is safe and relatively economical in operation. The furnace may be used for brazing ferrous metals, in which case the product may be brazed and not annealed. With non-ferrous metals the annealing operation may be performed alone, or, if brazing is to be done, the brazing and annealing operation may be combined. In either case the work is left in a clean and dry state suitable for proceeding directly to subsequent machining, pressing, or striking operations.

It will be apparent that while I have shown and described my method and a furnace for the practice thereof in the preferred form, many changes and modifications may be made in the method and structure disclosed without departing from the spirit of the invention, defined in the following claims.

I claim:

1. A reducing furnace for brazing and/or annealing parts of jewelry such as watch cases and the like, comprising a furnace tube having a flat lower side and an entrant end and a discharge end, means to heat a section of the furnace tube near the entrant end, water cooling means to greatly chill a section of the furnace tube near the discharge end, a plurality of trays for holding the parts to be brazed arranged to slide along the bottom of the furnace tube, a source of reducing gas connected to the furnace tube at the discharge end thereof, and means causing said gas to flow toward the entrant end thereof.

2. A reducing furnace for brazing and/or annealing parts of jewelry such as watch cases and the like, comprising a relatively long furnace tube which is rectangular in cross-section and which has a work entrant end and a work discharge end, means to heat a section of the furnace tube near the entrant end, water cooling means to greatly chill a section of the furnace tube near the discharge end, a plurality of trays for holding the parts to be brazed arranged to slide in continuous sequence along the bottom of the furnace tube, means to move said trays toward the discharge end of the furnace, and a source of reducing gas connected to the furnace tube at the discharge end thereof, and means causing said gas to flow toward the entrant end thereof.

3. A reducing furnace comprising a furnace tube having an open end, a heating furnace surrounding said tube, a source of reducing gas connected to said tube, a flue for the products of combustion from the heating furnace, and means for guiding the reducing gas from the open end of the tube into the furnace chamber and thence up into the flue.

4. A reducing furnace comprising a furnace tube having an open end, a heating furnace surrounding said tube, a source of reducing gas connected to said tube, a flue for the products of combustion from the heating furnace, and means for guiding the spent reducing gas from the open end of the tube to the flue.

5. A reducing furnace comprising a furnace tube having an open end and a closed end, a heating circuit including a heating furnace surrounding said tube and a discharge flue, a source of reducing gas connected to said tube near its closed end, and means for guiding the reducing gas from the open end of the tube into the heating circuit.

6. A reducing furnace comprising a furnace tube, an opening at one end thereof, a heating furnace surrounding said tube, a door at the other end thereof, a reducing gas inlet to the tube near the latter end thereof, a pilot light situated adjacent but outside of the door for automatically igniting the reducing gas when the door is opened, and means for guiding the used reducing gas from the open end of the furnace tube into the heating furnace surrounding the furnace tube.

7. A reducing furnace comprising a furnace tube, an opening at one end thereof, a heating furnace near the said end thereof, a door at the other end thereof, a cooling section near the latter end thereof, a reducing gas inlet to the tube near the latter end thereof, a pilot light situated adjacent but outside of the door for automatically igniting the reducing gas when the door is opened, a flue for the heating furnace, and means at the open end of the tube for guiding the reducing gas from the tube to the flue.

8. A reducing furnace comprising a furnace tube, an opening at one end thereof, a heating furnace near the said end thereof, a door at the other end thereof, a cooling section near the latter end thereof, a reducing gas inlet to the tube near the latter end thereof, a pilot light situated adjacent but outside of the door for automatically igniting the reducing gas when the door is opened, a flue for the heating furnace, and a hood at the open end of the tube for guiding the reducing gas from the tube into the furnace and flue.

9. A reducing furnace comprising a furnace tube, a work entrant opening at one end of the tube, a heating furnace near the said end thereof, a work discharge opening and a door therefor at the other end of the tube, a cooling section surrounding the tube near the discharge end thereof, a reducing gas inlet to the tube near the discharge end thereof, a pilot light situated outside the door but adjacent the work discharge end of the tube for automatically igniting the reducing gas when the door is opened for the removal of work from the furnace, a flue for the heating furnace, and means at the entrant end of the tube for guiding the reducing gas from the tube to the furnace and flue.

10. A reducing furnace comprising a furnace tube which is rectangular in cross-section, a work entrant opening at one end of the tube, a fuel gas heating furnace surrounding the tube near the said end thereof, a work discharge opening and a door therefor at the other end of the tube, a water jacketed cooling section surrounding the tube near the discharge end thereof, a reducing gas inlet to the tube near the discharge end thereof, a pilot light situated outside the door but adjacent the discharge end of the tube for automatically igniting the reducing gas when the door is opened for the removal of work from the furnace, a flue for the heating furnace, and means including a hood at the entrant end of the tube for guiding the reducing gas from the tube to the furnace and flue.

Signed at New York, in the county of New York and State of New York, this 5th day of March, A. D. 1929.

GEORGE BRANDT.